United States Patent
Hashimoto et al.

(10) Patent No.: US 9,040,147 B2
(45) Date of Patent: May 26, 2015

(54) COVER GLASS FOR A MOBILE DEVICE

(75) Inventors: Kazuaki Hashimoto, Tokyo (JP); Go Chiwata, Tokyo (JP); Dongna Qin, Tokyo (JP); Masatomo Shibui, Hanoi (VN)

(73) Assignees: HOYA CORPORATION, Tokyo (JP); HOEV COMPANY, LIMITED, Hanoi (VN)

( * ) Notice: Subject to any disclaimer, the term of this patent is extended or adjusted under 35 U.S.C. 154(b) by 465 days.

(21) Appl. No.: 13/451,017

(22) Filed: Apr. 19, 2012

(65) Prior Publication Data
US 2012/0270016 A1  Oct. 25, 2012

(30) Foreign Application Priority Data

Apr. 20, 2011 (JP) ................. 2011-094522
Sep. 2, 2011 (JP) ................. 2011-191281
Dec. 28, 2011 (JP) ................. 2011-287763

(51) Int. Cl.
| | | |
|---|---|---|
| B32B 1/00 | (2006.01) | |
| B32B 3/00 | (2006.01) | |
| C03C 15/00 | (2006.01) | |
| C03C 21/00 | (2006.01) | |

(52) U.S. Cl.
CPC .............. *C03C 15/00* (2013.01); *C03C 21/002* (2013.01)

(58) Field of Classification Search
CPC ............. B32B 3/00; B32B 3/02; B32B 3/28; B32B 3/30; B32B 17/00; B31F 1/07; B31F 2201/0717
USPC .......................... 428/156, 172, 174, 187, 426
See application file for complete search history.

(56) References Cited

U.S. PATENT DOCUMENTS

| | | | |
|---|---|---|---|
| 4,622,272 A | 11/1986 | Wengert et al. | |
| 8,367,208 B2 * | 2/2013 | Glaesemann et al. | ........ 428/410 |
| 2003/0146702 A1 | 8/2003 | Amano | |
| 2009/0146992 A1 | 6/2009 | Fukunaga et al. | |
| 2011/0003619 A1 | 1/2011 | Fujii | |

FOREIGN PATENT DOCUMENTS

| | | |
|---|---|---|
| FR | 2593804 A1 | 8/1987 |
| GB | 543031 | 8/1940 |
| JP | 60025137 A | 7/1985 |
| JP | 2004133035 A | 4/2004 |
| JP | 2005-123735 A | 5/2005 |
| JP | 2006-27023 A | 2/2006 |
| JP | 2009-140193 A | 6/2009 |
| JP | 2010195600 A | 9/2010 |

OTHER PUBLICATIONS

English translation for JP 2010-195600; Nishiyama, Sakae; published Sep. 9, 2010.*
English translation for JP 2006-027023A; Sasaki et al; published Feb. 2, 2006.*
Extended Search Report issued in corresponding European Patent Application No. 121642219 dated Oct. 23, 2013.
European Search Report corresponding to European Patent Application No. 12164221.9, dated Sep. 19, 2012.
Office Action issued in corresponding Chinese Patent Application No. 201210118917.2 dated Mar. 20, 2015.

* cited by examiner

*Primary Examiner* — Catherine A Simone
(74) *Attorney, Agent, or Firm* — Sughrue Mion, PLLC (57) ABSTRACT

A cover glass for use in a mobile device such as a touch-panel mobile telephone has a thickness in the range of, for example, 0.3 mm to 1.5 mm. A recess that can be recognized as a character or a figure when watching from the front side of the mobile device or a recess that can be recognized when touching from the front side of the mobile device is formed on at least one of opposite main surfaces of the cover glass. A surface of this recess is an etched surface treated by etching.

15 Claims, 6 Drawing Sheets

COVER GLASS FOR A MOBILE DEVICE

This application is based upon and claims the benefit of priority from Japanese Patent Application No. 2011-094522, filed Apr. 20, 2011, Japanese Patent Application No. 2011-191281, filed on Sep. 2, 2011, and Japanese Patent Application No. 2011-287763, filed on Dec. 28, 2011, the disclosures of which are incorporated herein in their entirety by reference.

TECHNICAL FIELD

This invention relates to a cover glass for a mobile device (hereinafter may also be referred to as a "mobile device cover glass"), which is adapted to be used on a display screen of a mobile device such as a mobile telephone, a PDA (personal digital assistant), or a mobile game device.

BACKGROUND ART

In a mobile device such as a mobile telephone, a PDA, or a mobile game device, an acrylic resin plate which is excellent in transparency and lightweight has generally been used on a display screen thereof. In recent years, however, instead of the conventional acrylic resin plate, use has often been made of a cover glass formed of a glass material which has high strength even if it is thin and which is superior in various points such as surface smoothness, protectiveness (weather resistance, antifouling property), appearance, and high-quality image to the conventional acrylic resin plate.

Normally, on this cover glass, a character or figure pattern, such as a logo of a company or product name or marks of operation buttons, is formed by a printing method.

A relevant technique is disclosed in, for example, JP-A-2006-27023 (Patent Document 1).

SUMMARY OF THE INVENTION

Recently, instead of the conventional printing method, there has been demanded a method of directly carving a character or figure pattern on a cover glass. By directly carving the character or figure pattern on the cover glass, when watching a display screen of a mobile device from its front side, it is possible to impart deep three-dimensionality to the character or figure pattern and thus to provide high aesthetic decoration on the character or figure pattern. In the case of a mobile game device or the like, it is also required that a user can recognize an operation button only by the sense of touch of his/her fingertip.

Patent Document 1 discloses a decorative article comprising a first plate-like member the whole or a part of which is substantially transparent, a first decorative portion comprising a groove formed on one surface of the first plate-like member and a colored portion colored by putting a coloring agent in the groove, a second plate-like member which is bonded to the one surface of the first plate-like member and the whole or a part of which is substantially transparent, and a second decorative portion which is formed by applying decoration to a surface, on the opposite side of the first plate-like member, of the second plate-like member, wherein when watching from the other surface side of the first plate-like member, the first and second decorative portions are visually recognized so that, for example, they at least partially overlap each other. Patent Document 1 also describes a clock or watch using this decorative article as a cover glass and further describes the use of this decorative article as a cover member for a liquid crystal display portion of an electronic device such as a mobile telephone, a pager or beeper, or a desk calculator.

Incidentally, touch-panel mobile devices have become predominant in recent years. The touch-panel mobile device is mostly operated by pressing a predetermined portion of a display screen (e.g. an icon or the like displayed on the screen). Since the display screen is repeatedly and frequently pressed, the strength of the display screen is required to be improved for adaptation to this touch panel function and, for this purpose, there is a need for a cover glass which has sufficient strength even if it is thin or lightweight or is large in area for covering a large display screen.

Although the cover glass is chemically strengthened for improving its strength, one of factors that reduce the strength of the cover glass is a crack. If the cover glass has a crack on its main surface or end face, the crack grows in size to cause breakage of the cover glass even with a relatively small impact. For example, in the case where a method of directly carving a character or figure pattern on the cover glass by machining is carried out after the cover class is chemically strengthened, fine cracks tend to occur so that the strength of the cover glass is significantly reduced. Under certain circumstances, there is a possibility that the cover glass may be broken during machining. This problem tends to notably occur particularly when the character or figure pattern is carved at an end of the cover glass or when the cover glass is as thin as, for example, 1.5 mm or less.

Although Patent Document 1 describes the structure of the first decorative portion obtained by forming the groove on one surface of the first plate-like member the whole or a part of which is substantially transparent and forming the colored portion by putting the coloring agent in the groove, the decorative article of Patent Document 1 is based on the bonding structure of the first and second plate-like members to achieve the decorative beauty by overlapping the first decorative portion provided on the first plate-like member and the second decorative portion provided on the second plate-like member. Therefore, even if the structure of this decorative article is applied, for example, to the cover member of the mobile telephone, it is absolutely not possible to satisfy the above-mentioned need that the cover glass particularly for use in the touch-panel mobile device which has been predominant in recent years has sufficient strength even if it is thin or lightweight or is large in area for covering a large display screen.

This invention has been made under these circumstances and its objects are, first, to provide a cover glass which is formed, on at least one of its opposite main surfaces, with a recess that can be recognized as a character or a figure when watching from the front side of a mobile device or with a recess that can be recognized when touching from the front side of a mobile device, and which further has sufficient strength, second, to provide a cover glass which has sufficient strength even if it is thin or lightweight or is large in area for covering a large display screen, third, to provide a cover glass which is suitable for a touch-panel mobile device, fourth, to provide a cover glass which is suitable when a glass material (glass substrate) to be chemically strengthened is used, and, fifth, to provide a mobile device cover glass which (e.g. whose recess) can be recognized by a user even in an environment, such as outdoors at night, where the quantity of light irradiated (incident) on the cover glass is small.

As a result of intensive studies to achieve the above-mentioned objects, the present inventor has completed this invention.

Specifically, this invention has the following structures.

(Structure 1)

A cover glass for use in a mobile device, wherein a recess that is recognized as a character or a figure when watching from a front side of the mobile device or a recess that is recognized when touching from the front side of the mobile device is formed on at least one of opposite main surfaces of the cover glass, and wherein a surface of the recess is an etched surface treated by etching.

(Structure 2)

A cover glass for use in a mobile device, wherein opposite main surfaces of the cover glass comprises an area corresponding to a touch panel which enables the mobile device to be operated by pressing the predetermined portion, wherein a recess that is recognized as a character or a figure when watching from a front side of the mobile device or a recess that is recognized when touching from the front side of the mobile device is formed on at least one of the main surfaces of the cover glass, and wherein a surface of the recess is an etched surface treated by etching.

(Structure 3)

The cover glass according to Structure 2, wherein the recess is present in the area corresponding to the touch panel.

(Structure 4)

The cover glass according to any one of Structures 1 to 3, wherein the cover glass is made of a chemically strengthened aluminosilicate glass.

(Structure 5)

The cover glass according to any one of Structures 1 to 4, wherein the recess that is recognized as the character or the figure when watching from the front side of the mobile device is formed on each of the opposite main surfaces of the cover glass.

(Structure 6)

The cover glass according to any one of Structures 1 to 5, wherein an edge portion at a boundary between a flat portion of the main surface of the cover glass and an inner surface of the recess has a rounded shape.

(Structure 7)

The cover glass according to any one of Structures 1 to 6, wherein a value of compressive stress value×compressive stress layer depth/(remaining thickness−compressive stress layer depth) is 150 MPa or less where the remaining thickness represents a thickness of the cover glass excluding a depth of the recess and where the compressive stress value and the compressive stress layer depth respectively represent a compressive stress value and a depth of a compressive stress layer at a flat portion of the main surface of the cover glass.

(Structure 8)

The cover glass according to any one of Structures 1 to 7, wherein the cover glass has a thickness in a range of 0.3 mm to 1.5 mm.

(Structure 9)

The cover glass according to any one of Structures 3 to 8, wherein the compressive stress value of the main surface of the chemically strengthened cover glass is 300 MPa or more.

(Structure 10)

The cover glass according to any one of Structures 3 to 9, wherein the thickness of the cover glass excluding the depth of the recess is three or more times the depth of the compressive stress layer formed by chemical strengthening.

(Structure 11)

The cover glass according to any one of Structures 1 to 10, wherein the thickness of the cover glass excluding the depth of the recess is 200 µm or more.

(Structure 12)

The cover glass according to any one of Structures 1 to 11, wherein the cover glass has a rectangular external shape and the main surface has an area of 30 cm$^2$ or more.

(Structure 13)

The cover glass according to any one of Structures 3 to 12, wherein the main surface of the chemically strengthened cover glass has a Young's modulus of 65 GPa or more.

(Structure 14)

The cover glass according to any one of Structures 3 to 13, wherein the main surface of the chemically strengthened cover glass has a Vickers hardness of 400 or more.

(Structure 15)

The cover glass according to any one of Structures 1 to 14, wherein an end face of the cover glass is an etched surface treated by etching.

(Structure 16)

The cover glass according to any one of Structures 1 to 15, wherein the cover glass is chemically strengthened in order to prevent breakage of the cover glass when the cover glass is placed on a ring-shaped stainless receiving jig with an outer diameter of 40 mm and an inner diameter of 30 mm which is disposed so as to surround an area, where the recess is formed, of the cover glass and then a cylindrical steel flat head with a diameter of 10 mm presses, from above, a recess-formed portion of the cover glass with a load of 200N for 2 seconds, the cylindrical steel flat head having a front end to which an elastic material with a thickness of 1 mm and with a rubber hardness of 50 (JIS K6253 or ISO18517) is bonded.

(Structure 17)

The cover glass according to any one of Structures 1 to 15, wherein the cover glass is chemically strengthened in order to prevent breakage of the cover glass when the cover glass is placed on a ring-shaped stainless receiving jig with an outer diameter of 40 mm and an inner diameter of 30 mm whose surface in contact with the cover glass is a smooth surface and which is disposed so as to surround an area, where the recess is formed, of the cover glass and then an elastic material with a diameter of 10 mm and a thickness of 1 mm and with a rubber hardness of 50 (JIS K6253 or ISO18517) is brought into contact with the cover glass and presses, from above, a recess-formed portion of the cover glass with a load of 200N for 2 seconds so that the load is uniformly applied to the elastic material.

(Structure 18)

The cover glass according to any one of Structures 1 to 17, wherein at least a part of the recess comprises a luminous portion containing a luminous material that is recognized by a user even in an environment where a quantity of light irradiated on the cover glass is small.

(Structure 19)

A cover glass for use in a mobile device, wherein a recess is formed on at least one of opposite main surfaces of the cover glass, and wherein at least a part of the recess comprises a luminous portion containing a luminous material that is recognized by a user even in an environment where a quantity of light irradiated on the cover glass is small.

(Structure 20)

The cover glass according to Structure 19, wherein a surface of the recess is an etched surface treated by etching.

According to this invention, it is possible to provide a cover glass which is formed, on at least one of its opposite main surfaces, with a recess that can be recognized as a character or a figure when watching from the front side of a mobile device or with a recess that can be recognized when touching from the front side of a mobile device, and which further has sufficient strength.

According to this invention, it is possible to provide a cover glass which has sufficient strength even if it is thin or lightweight or is large in area for covering a large display screen.

According to this invention, it is possible to provide a cover glass which is suitable for a touch-panel mobile device.

According to this invention, it is possible to provide a cover glass which is suitable when a glass material (glass substrate) to be chemically strengthened is used.

According to this invention, it is possible to provide a mobile device cover glass which (e.g. whose recess) can be recognized by a user even in an environment, such as outdoors at night, where the quantity of light irradiated (incident) on the cover glass is small.

DETAILED DESCRIPTION OF THE INVENTION

Hereinbelow, an embodiment of this invention will be described in detail with reference to the drawings.

Figure 1:
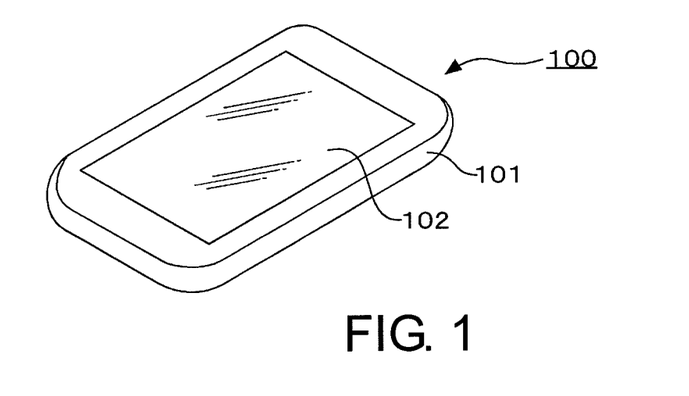
FIG. 1 is an overall perspective view showing one example of a mobile device related to this invention.

FIG. 1 is an overall perspective view showing one example of a mobile device related to this invention.

As the one example of the mobile device, FIG. 1 shows a mobile telephone 100 which is mostly operated by a touch panel. The mobile telephone 100 comprises a housing 101 and a display screen 102 on its surface side, wherein the display screen 102 is provided with a cover glass.

More specifically, the cover glass is disposed on the display screen 102 on the front side of the mobile telephone 100, thereby protecting the display screen 102.

The cover glass is required to have strength sufficient to protect the display screen 102 from damage due to an external impact. Particularly in the case of the touch panel, the mobile telephone 100 is operated by pressing a predetermined portion of the display screen 102 (e.g. an icon or the like displayed on the screen) and, since the display screen 102 is repeatedly and frequently pressed, there is required, for adaptation to this touch panel function, a cover glass which has sufficient strength even if it is thin or lightweight or is large in area for covering a large display screen.

FIGS. 2A to 2D are plan views respectively showing examples of the external shapes of mobile device cover glasses according to this invention.

Figure 2A:
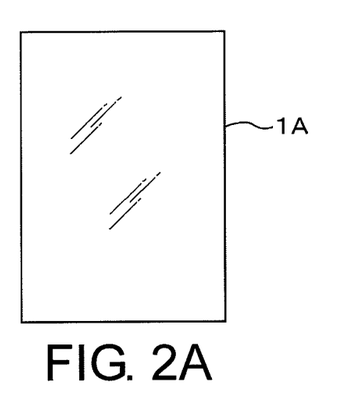
FIGS. 2A to 2D are plan views respectively showing examples of the external shapes of mobile device cover glasses according to this invention.
Figure 2B:
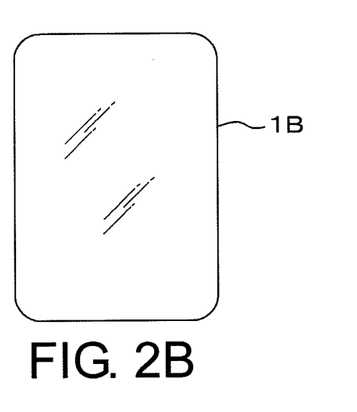
Figure 2C:
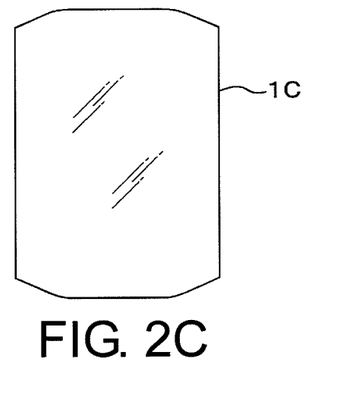
Figure 2D:
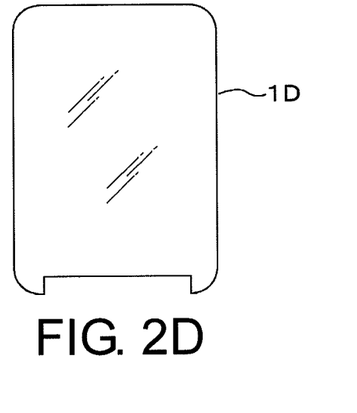

FIGS. 2A to 2D each show the example in which the external shape of the cover glass is rectangular, wherein FIG. 2A shows a cover glass 1A having a simple rectangular shape, FIGS. 2B and 2C respectively show cover glasses 1B and 1C each having a rectangular shape with rounded corners, and FIG. 2D shows a cover glass 1D having a rectangular shape with rounded corners, partially cut out. The external shape of the cover glass depends on the shape, structure, and so on of a mobile device into which it is incorporated, and thus the examples shown in FIGS. 2A to 2D are for illustrative purposes only and are not intended to limit cover glasses of this invention in any aspect. Further, for example, a cover glass having a hole such as a receiver hole on a surface thereof is also included in this invention.

A mobile device cover glass of this invention is formed, on at least one of its opposite main surfaces, with a recess or recesses that can be recognized as a character or characters or a figure or figures when watching from the front side of a mobile device or with a recess or recesses that can be recognized when touching from the front side of a mobile device. The character or characters or the figure or figures form, for example, a pattern of a logo of a company or product name or a pattern of a mark or marks of an operation button or operation buttons.

Figure 3:
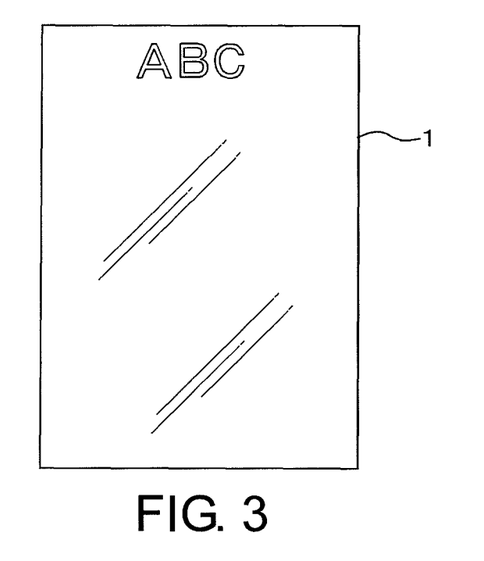
FIG. 3 is a plan view showing an example in which recesses that can be recognized as characters are formed on a main surface of a cover glass.
Figure 4A:
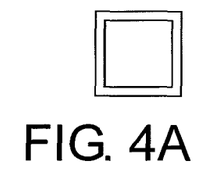
FIGS. 4A and 4B are diagrams respectively showing examples of recesses, that can be recognized as figures, to be formed on a main surface of a cover glass.
Figure 4B:
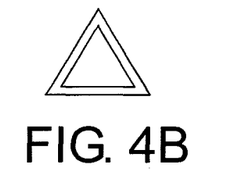

FIG. 3 is a plan view showing an example in which recesses that can be recognized as characters are formed on a main surface of a cover glass, while FIGS. 4A and 4B are diagrams respectively showing examples of recesses, that can be recognized as figures, to be formed on a main surface of a cover glass. In FIG. 3, on a main surface on the back side (back side in FIG. 3) of a cover glass 1, there are formed recesses that can be recognized as characters such as "ABC" when watching from the front side thereof. A recess to be formed is not limited to a character and may be a figure such as a square shown in FIG. 4A or a triangle shown in FIG. 4B.

By forming a recess, in the form of a carved character or figure pattern, on a cover glass instead of the conventional printing method, when watching a display screen of a mobile device from its front side, it is possible to impart deep three-dimensionality to the character or figure pattern and thus to provide high aesthetic decoration on the character or figure pattern. Such a recess enables a user to recognize the kind of operation button (operation key), i.e. what operation button it is, only by the sense of touch of his/her fingertip without visual confirmation. For example, in the case of a mobile game device, a user only watches a display screen and hardly watches an operation button during a game, and thus the above-mentioned recess is preferably applied to such an operation button of the mobile game device. It is to be noted that a cover glass having a surface formed with a recess and further applied with printing is also included in this invention.

Figure 5:
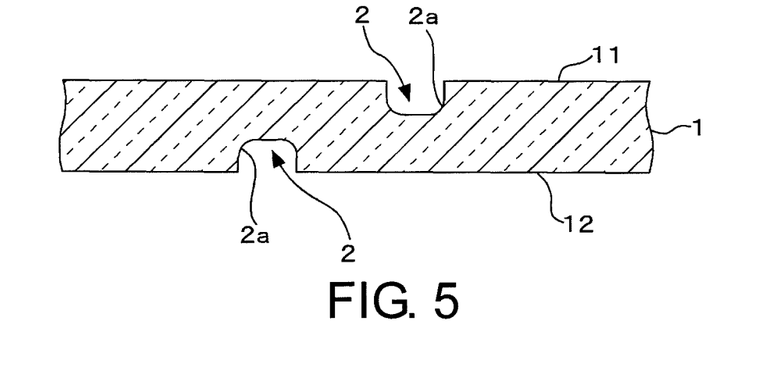
FIG. 5 is a cross-sectional view of a mobile device cover glass according to this invention.

FIG. 5 is a cross-sectional view of a cover glass 1 according to this invention.

In FIG. 5, recesses 2 that can be recognized as characters or figures when watching from the front side of a mobile device or that can be recognized when touching from the front side of a mobile device are respectively formed on front and back opposite main surfaces 11 and 12 of the cover glass 1. Naturally, the recess 2 that is mainly intended to be recognized when touching from the front side of the mobile device is formed on one of the opposite main surfaces 11 and 12 of the cover glass 1, i.e. on the main surface of the cover glass 1 on the front side of the mobile device when the cover glass 1 is mounted on the mobile device.

In sum, the recess 2 formed on the main surface of the cover glass 1 on the front side of the mobile device can be recognized visually and by touching, while the recess 2 formed on the main surface on the opposite side of the cover glass 1 can be recognized only visually.

The structure of the cover glass 1 according to this invention is particularly characterized in that a surface 2a of each recess 2 is an etched surface treated by etching. In order to form the surface 2a of the recess 2 as the etched surface, it is preferable to form the recess 2 on the main surface 11, 12 of the cover glass 1 by etching. According to a study by the present inventor, it has been found that when the recess 2 is formed on the main surface 11, 12 of the cover glass 1 by etching so that the surface 2a of the formed recess 2 is the etched surface, since it is possible to suppress the occurrence of fine cracks or the like during the etching, the strength of the cover glass 1 is not reduced and thus it is possible to maintain high strength of the cover glass 1 which is obtained, for example, by chemical strengthening. In particular, in the case where the recess 2 is formed on the cover glass 1 and is pressed, the strain of the cover glass 1 becomes large as compared with the case where no recess is formed and, as a result, the stress applied to the surface 2a of the recess 2 increases so that the cover glass 1 tends to be affected by fine cracks or the like on the surface 2a of the recess 2. Therefore, when the recess 2 is formed on the main surface of the cover glass 1 as in this invention, the surface 2a of the recess 2 is preferably the etched surface formed by etching.

Accordingly, this invention is particularly suitable for the case where, for example, the main surface 11, 12 of the cover glass 1 has a touch panel area (an area corresponding to a touch panel) and at least one of the recesses 2 is present in the touch panel area.

According to this invention, it is possible to provide a cover glass which is formed, on at least one of its opposite main surfaces, with a recess that can be recognized as a character or a figure when watching from the front side of a mobile device or with a recess that can be recognized when touching from the front side of a mobile device, and which further has sufficient strength.

Figure 9:
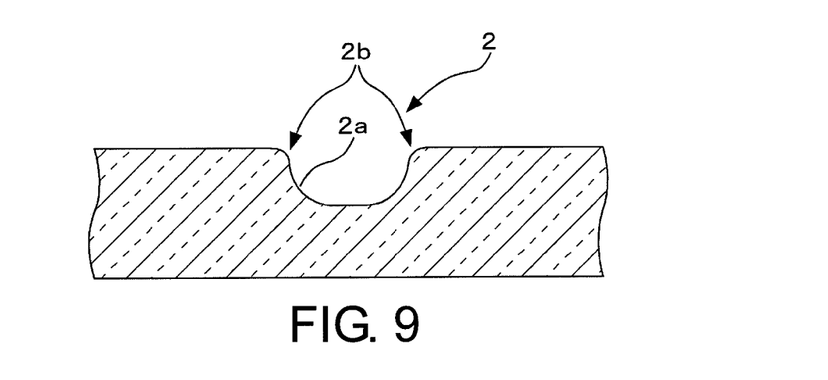
FIG. 9 is a diagram showing a preferred cross-sectional shape of a recess.

Referring now to FIG. 9, the recess 2 will be described in detail. In this invention, the cross-sectional shape of the recess 2 is preferably such that, for example, as shown in FIG. 9 showing a cross section of the cover glass 1, an edge portion 2b at the boundary between a flat portion of the main surface of the cover glass 1 and an inner surface (wall surface) 2a of the recess 2 has a rounded shape. In the case of a mobile device to which this invention is applied, operation buttons in a touch panel area are often each smaller than a fingertip of a user so that his/her fingertip presses not only the inner surface 2a of the recess 2, but also the edge portion 2b to apply the load thereto. As described above, since the edge portion 2b has the rounded shape, it is possible to reduce stress concentration when the pressing load is repeatedly applied also to the edge portion 2b and thus to suppress a reduction in the mechanical strength of the recess 2. Further, since the edge portion 2b is rounded, there is also an effect that even if the user repeatedly presses the recess 2 with his/her fingertip, the fingertip does not feel pain.

Further, as shown in FIG. 9, in this invention, it is more preferable that, in cross-sectional view of the cover glass 1, the boundary between a bottom portion of the recess 2 and the inner surface 2a as the wall surface of the recess 2 also have a rounded shape. It is further preferable that the entire bottom portion have a rounded shape. In other words, it is more preferable that, in cross-sectional view of the cover glass 1, no angular portion be formed in the recess 2 itself or at the boundary between the recess 2 and the flat portion of the main surface. With this configuration, since no stress concentration occurs when the user presses the recess 2, it is possible to further prevent damage to the cover glass 1.

Further, according to this invention, it is possible to provide a cover glass which has sufficient strength even if it is thin or lightweight or is large in area for covering a large display screen. In this invention, the overall thickness of the cover glass can be as small as, for example, 0.3 mm to 1.5 mm. Further, in this invention, the external shape of the cover glass may be, for example, rectangular and the area of its main surface can be as large as, for example, 30 cm$^2$ or more.

Further, according to this invention, it is possible to provide a cover glass which is suitable for a touch-panel mobile device whose display screen is particularly required to have high strength.

Next, a method of forming the recesses 2 by etching will be described.

FIGS. 6A to 6D are cross-sectional views sequentially showing processes of forming the recesses 2 on the cover glass 1 by etching. Resist (photosensitive organic material, particularly photosensitive resin material) layers 3 are respectively coated and formed on the front and back opposite main surfaces of the cover glass 1 (see FIG. 6A). Then, predetermined exposure and development are carried out to form a resist pattern having a recess pattern 3a (i.e. the resist layer 3 is removed at a recess forming area) on each of the opposite main surfaces of the cover glass 1 (see FIG. 6B).

Figure 6A:
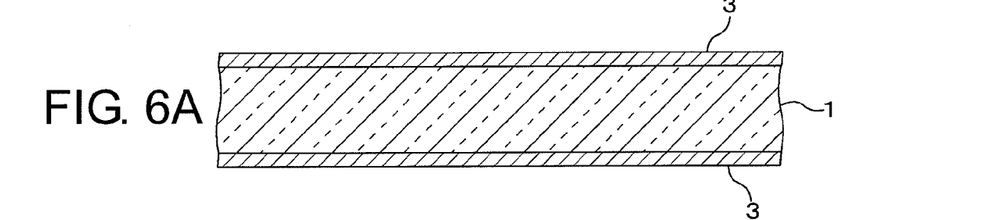
FIGS. 6A to 6D are cross-sectional views sequentially showing processes of forming recesses on a cover glass by etching.
Figure 6B:
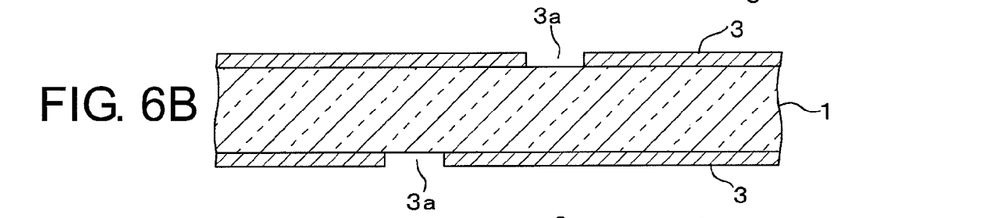
Figure 6C:
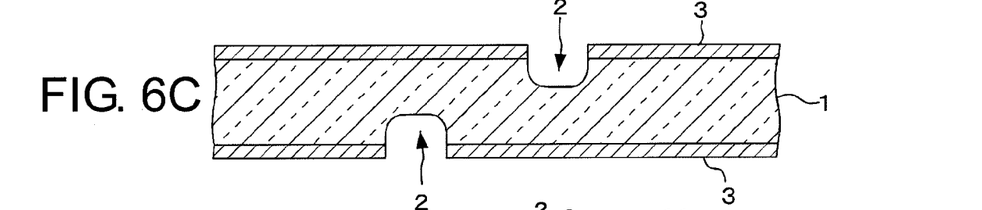

Then, using the resist patterns as masks, wet etching is carried out by the use of an etchant (e.g. acidic solution containing hydrofluoric acid) that can dissolve a material of the cover glass 1, thereby forming the recesses 2, each capable of being recognized as a character or a figure when watching from the front side, on both front and back main surfaces of the cover glass 1, respectively (see FIG. 6C). As the acidic solution containing hydrofluoric acid, use can be made of, for example, a hydrofluoric acid aqueous solution, a mixed solution of hydrofluoric acid and hydrochloric acid, a mixed solution of hydrofluoric acid and sulfuric acid, or an aqueous solution containing ammonium fluoride. Since the wet etching is isotropic etching (etching proceeds not only in a vertical direction, but also in a lateral direction), corners of the bottom of each recess 2 are finished to a rounded shape. As a consequence, stress dispersion can be achieved and thus it is preferable to form the recesses 2 by wet etching. Alternatively, the recesses 2 may be formed by dry etching.

Figure 6D:
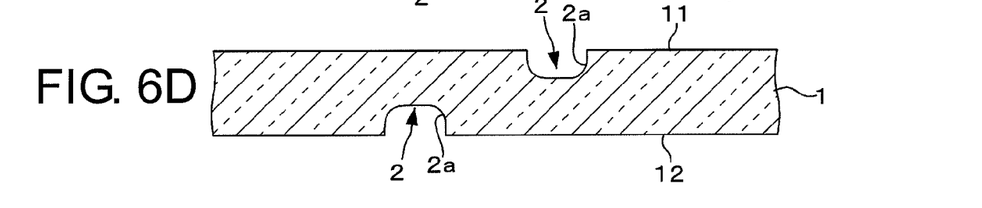

Then, the remaining resist patterns are stripped and then cleaning is carried out (see FIG. 6D).

In this manner, the cover glass 1 of the embodiment shown in FIG. 5 is completed. Herein, while the description has been given of the case where the recesses are respectively formed on both main surfaces of the cover glass, if the recess is formed on only one of the main surfaces of the cover glass, the above-mentioned recess pattern may be formed only in the resist layer on the main surface where the recess is to be formed.

In order to form the rounded edge portion 2b at the boundary between the flat portion of the main surface of the cover glass 1 and the inner surface 2a of the recess 2 as shown in FIG. 9, the following method, for example, is preferable.

Specifically, on the main surface of the cover glass 1, there is formed a resist pattern having a polymerization degree gradient in its thickness direction so that the polymerization degree becomes minimum on the main surface side thereof, and then, using this resist pattern as a mask, the above-mentioned wet etching is carried out. By providing the polymerization degree gradient on the thickness direction of the resist so that the polymerization degree becomes minimum on the glass main surface side of the resist, it is possible to weaken the adhesion between the glass (main surface) and the resist in the formation of the resist pattern. In order to provide the polymerization degree gradient on the thickness direction of the resist so that the polymerization degree becomes minimum on the glass main surface side of the resist to thereby weaken the adhesion between the glass and the resist, the resist thickness, the exposure amount, and the post-bake condition, for example, are controlled. These conditions are properly changed according to the kind of resist to be used and the energy of exposure light. By controlling the adhesion between the glass and the resist in this manner, the etchant easily permeates into the interface between the resist and the glass (main surface) and, as a result, the edge portion 2b is formed into the rounded shape.

The thickness of the cover glass of this invention is preferably in the range of, for example, about 0.3 mm to 1.5 mm and more preferably in the range of about 0.5 mm to 0.7 mm in terms of responding to the recent market needs for thinner and lighter mobile devices.

In this invention, the cover glass is preferably made of an amorphous aluminosilicate glass. A glass substrate made of such an aluminosilicate glass has high strength after chemical strengthening and thus is excellent. As such an aluminosilicate glass, use can be made of an aluminosilicate glass which mainly contains 58 to 75 wt % $SiO_2$, 0 to 20 wt % $Al_2O_3$, 0 to 10 wt % $Li_2O$, and 4 to 20 wt % $Na_2O$.

It is preferable that the cover glass of this invention be chemically strengthened for improving its strength.

As a chemical strengthening method, it is preferable to use, for example, a low-temperature ion-exchange method which performs ion exchange in a temperature range not exceeding the glass transition point, for example, at a temperature of 300° C. or more and 500° C. or less. The chemical strengthening is a treatment in which a glass substrate is brought into contact with a molten chemical strengthening salt so that alkali metal element ions having a relatively small ionic radius in the glass substrate are ion-exchanged with alkali metal element ions having a relatively large ionic radius in the chemical strengthening salt, thereby penetrating the alkali metal element ions having the relatively large ionic radius into a surface layer of the glass substrate to generate compressive stress on surfaces of the glass substrate. As the chemical strengthening salt, an alkali metal nitrate such as potassium nitrate or sodium nitrate can be preferably used. Since the chemically strengthened glass substrate is improved in strength and thus is excellent in impact resistance, it is suitable for a cover glass for use in a mobile device which is subjected to an impact or pressing and thus is required to have high strength. Particularly in this invention, since high strength obtained by the chemical strengthening can be maintained even if the recess is formed on the main surface of the cover glass, the chemical strengthening is effective.

In this invention, the chemical strengthening may be carried out before or after the above-mentioned recess formation.

In terms of ensuring the strength of the cover glass, it is preferable to carry out the chemical strengthening after the recess formation. The reason for this is that an internal tensile stress layer corresponding to a surface compressive stress layer is present inside the chemically strengthened glass substrate. This internal tensile stress may cause breakage of the glass substrate when an external force or the like is applied to the glass substrate. Therefore, it is preferable to carry out the recess formation before the chemical strengthening. Further, the recess formation is preferably carried out by etching rather than machining. The reason for this is that the machining tends to cause the occurrence of fine cracks or the like on the recess and that these cracks grow in size to reach the internal tensile stress layer, thereby causing breakage of the glass substrate. Therefore, it is preferable to carry out the recess formation by the etching which less tends to cause the occurrence of fine cracks or the like as compared with the machining.

The cover glass of this invention is formed on its main surface with the recess that can be recognized as the character or figure, but has sufficient strength.

In this invention, in terms of ensuring the strength, for example, for adaptation to the touch panel function, the compressive stress value of the main surface of the chemically strengthened cover glass is preferably 300 MPa or more, particularly in the range of 400 to 800 MPa.

From the same point of view, the internal tensile stress value of the main surface of the chemically strengthened cover glass is preferably 150 MPa or less, particularly 80 MPa or less.

From the same point of view, the value of "compressive stress value×compressive stress layer depth/(remaining thickness−compressive stress layer depth)" is preferably 150 MPa or less, more preferably 100 MPa or less, and further preferably 80 MPa or less. Herein, the remaining thickness represents a thickness of the cover glass excluding the depth (thickness in depth direction) of the recess, while the compressive stress value and the compressive stress layer depth respectively represent values at a flat portion, other than the recess, of the main surface of the cover glass. The value of "compressive stress value×compressive stress layer depth/(remaining thickness−compressive stress layer depth)" is considered to correspond to an internal tensile stress, at a portion corresponding to the recess, of the main surface of the cover glass.

From the same point of view, the Young's modulus of the main surface of the chemically strengthened cover glass is preferably 65 GPa or more, particularly in the range of 65 to 100 GPa.

From the same point of view, the Vickers hardness [HV] of the main surface of the chemically strengthened cover glass is preferably 400 or more, particularly in the range of 400 to 800.

The Young's modulus can be measured according to JIS R1602. The Vickers hardness can be measured according to JIS Z2244 under conditions of a measuring load of 300 g and a pressing time of 15 seconds.

In this invention, the remaining thickness of the cover glass (i.e. the depth of the recess being excluded) is preferably three or more times and more preferably four or more times the depth of the compressive stress layer formed by the chemical strengthening. If it is less than three times the depth of the compressive stress layer, there is a possibility that the strength required for the cover glass is not obtained.

The depth of the recess can be measured using a Z-axis (depth direction) measuring microscope (e.g. non-contact Z-axis measuring microscope "micron depth/height measuring microscope: KY-90-HL-TV" manufactured by Nisshooptical Co., Ltd. or measuring microscope "MM-400" manufactured by Nikon Corporation). The compressive stress value and the depth (thickness) of the compressive stress layer at the main surface flat portion and the internal tensile stress value at the main surface flat portion can be measured by the Babinet method using a stress gauge (e.g. precision strain gauge "BSP-3" manufactured by Orihara Seisakusho Co., Ltd.).

In this invention, the remaining thickness of the cover glass is preferably 200 μm or more. If the remaining thickness is less than 200 μm, there is a possibility that the strength required for the cover glass is not obtained. In the case where the recesses are respectively formed on both main surfaces of the cover glass, the remainder obtained by subtracting the sum of the maximum depths of the respective main surfaces from the thickness of the cover glass is preferably 200 μm or more. In the case where the recesses having different depths are formed on one or each of both main surfaces of the cover glass, the remainder obtained by subtracting the maximum depth of the main surface or the sum of the maximum depths of the respective main surfaces from the thickness of the cover glass is preferably 200 μm or more.

The size (width) of the recess of the cover glass is preferably such that when the cover glass is touched by a finger, the finger is not brought into contact with the bottom of the recess.

When a comparison is made between the mechanical strengths (e.g. measured by a strength test method used in later-described Examples) of cover glasses having the same remaining thickness, but having different overall thicknesses, the cover glass having the greater overall thickness has greater strength. When a comparison is made between cover glasses having the same ratio between the overall thickness and the remaining thickness, the cover glass having the greater overall thickness tends to have greater strength.

The mobile device cover glass according to this invention is normally manufactured by cutting a large-size plate glass in the form of a sheet into small pieces of a predetermined size (product size). In this invention, it is also preferable to use etching when cutting a sheet-like glass member (large-size plate glass), manufactured by a downdraw method, a float method, or the like, into small pieces of a predetermined size. Since cut surfaces serve as end faces of each cover glass, the end faces of the cover glass obtained by cutting the large-size plate glass by etching are etched surfaces so that, as compared with a cutting method, for example, by machining, it is possible to suppress the occurrence of fine cracks or the like on the end faces of the cover glass and thus to prevent a reduction in the strength of the cover glass otherwise caused by these cracks or the like.

A large-size plate glass can be cut into cover glasses of a product size by etching, for example, in the following manner (see FIGS. 7A to 7C).

Figure 7A:
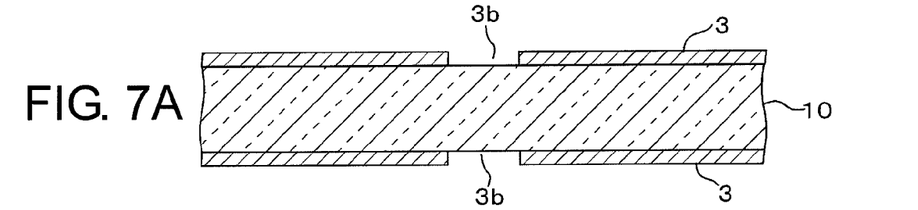
FIGS. 7A to 7C are cross-sectional views sequentially showing processes of cutting, by etching, a large-size plate glass into cover glasses of a product size.

Resist (photosensitive organic material) layers 3 are respectively coated and formed on both front and back main surfaces of a large-size plate glass 10 and then predetermined exposure and development are carried out to form resist patterns each having a cutting line pattern 3b (i.e. no resist is present on a cutting line of each resist pattern), wherein the cutting line patterns 3b are symmetrical to each other on the front and back main surfaces of the plate glass 10 (see FIG. 7A).

Figure 7B:
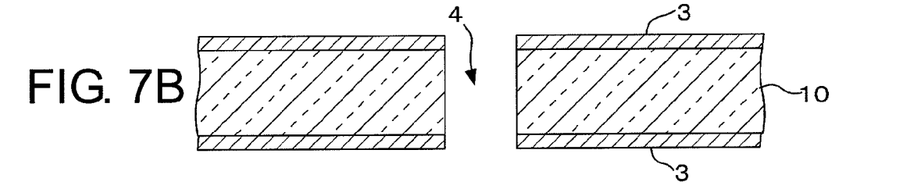

Then, using the resist patterns as masks, wet etching is carried out by the use of an etchant (e.g. acidic solution containing hydrofluoric acid) that can dissolve a material of the plate glass 10, thereby penetrating the plate glass 10 from its front and back main surfaces on the cutting lines to form a cut portion 4 so that the plate glass 10 is cut into small pieces of a predetermined size (see FIG. 7B). As the acidic solution containing hydrofluoric acid, use can be made of the same solution that is used in the etching for the above-mentioned recess formation.

Figure 7C:
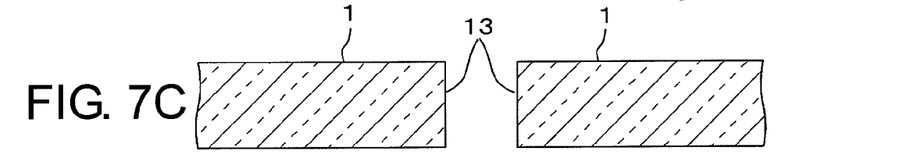

Then, the remaining resist patterns are stripped and then cleaning is carried out, thereby obtaining cover glasses 1 having end faces 13 (see FIG. 7C).

The end faces 13 of the cover glasses 1 thus obtained are etched surfaces.

Cutting of the plate glass 10 may be carried out by machining. However, as described above, the etching is preferable in that it is possible to suppress the occurrence of fine cracks or the like on the end faces of the cover glasses and thus to prevent a reduction in the strength of the cover glasses.

As described above, according to this invention, it is possible to provide a cover glass which has sufficient strength even if it is thin or lightweight or is large in area for covering a large display screen, and which is suitable for a touch-panel mobile device which is required to have particularly high strength.

Next, another embodiment of a mobile device cover glass according to this invention will be described.

It is convenient if a mobile device can be used in a dark environment, such as outdoors at night, where no external light is irradiated, and this has been requested recently.

Conventionally, there is known a method of printing a frame, which surrounds a display screen of a display device, with a paint on a back surface (surface on the display device side) of a cover glass for the display device (e.g. JP-A-2009-140193, JP-A-2005-123735, etc.). Using as a pigment contained in this paint a luminous paint added with, for example, phosphorescent zinc sulfide (ZnS:Cu), the display device emits light even in a dark environment and thus can be easily recognized visually.

However, the above-mentioned luminous paint has a property such that as its thickness increases, it increases in luminance and emits light for a longer time. Specifically, in order to obtain a luminance, that can be visually recognized even in a dark environment, using a luminous paint prepared by mixing a luminous pigment and a medium (resin component) in the weight ratio of about 1:1, the thickness of the luminous paint after drying should be at least 50 μm or more. In order to further increase the luminance and enable light emission for a longer time (e.g. 1 hour or more), the thickness should be 100 μm or more. Since this thickness is much greater than the coating thickness (about 20 μm or less) of a printing layer which is generally used for cover glass decoration (printing), there has been a problem that it is not possible to sufficiently achieve a reduction in the thickness of a mobile device cover glass including such a coating portion. Although Patent Document 1 describes the structure of the decorative portion obtained by forming the groove on one surface of the transparent plate-like member and forming the colored portion by putting the coloring agent in the groove, this coloring agent has no property of a luminous material and thus there is a problem that a mobile device having the structure of such a decorative portion cannot be visually recognized in a dark environment.

In view of this, a mobile device cover glass according to this invention is characterized in that at least a part of a recess that causes a user to recognize it as a character or a figure (i.e. a recess that can be recognized as a character or a figure when watching from the front side of a mobile device or a recess that can be recognized when touching from the front side of a mobile device) has a luminous portion containing a luminous material that can be recognized by the user even in an environment where the quantity of light irradiated (incident) on the cover glass is small.

According to such a mobile device cover glass of this invention, since the recess that causes the user to recognize it as the character or figure has the above-mentioned luminous portion, even in a dark environment, such as outdoors at night, where the quantity of light irradiated (incident) on the cover glass is small, the user can recognize the recess of the cover glass to operate the mobile device. Further, since the luminous portion is provided in the recess formed by digging down the cover glass, even if the luminous portion is formed with a thickness that enables high luminance and long-time light emission, it is possible to sufficiently achieve a reduction in the thickness of the cover glass. In sum, according to the mobile device cover glass of this invention, the luminous portion capable of emitting light with high luminance for a long time is provided so that the user can recognize the mobile device even in the dark environment such as outdoors at night to satisfactorily operate the mobile device, and further, the reduction in the thickness of the cover glass can also be achieved.

A mobile device cover glass according to this invention is characterized in that a recess is formed on at least one of opposite main surfaces of the cover glass and at least a part of the recess has a luminous portion containing a luminous material that can be recognized by a user even in an environment where the quantity of light irradiated (incident) on the cover glass is small.

In this case, the recess is a recess which is not particularly intended to cause the user to recognize it as a character or a figure, but which, for example, is formed in an outer peripheral region of the cover glass so as to allow the user to recognize the outer periphery of a mobile device. Also according to such a mobile device cover glass, the luminous portion capable of emitting light with high luminance for a long time is provided so that the user can recognize the outer periphery or the like of the mobile device even in a dark environment such as outdoors at night to satisfactorily operate the mobile device, and further, the reduction in the thickness of the cover glass can also be achieved.

The recess in this case can be formed by etching in the same manner as described before or machining. In this invention, however, it is preferable to use the etching. If the recess is formed by the etching so that a surface of the formed recess is an etched surface treated by the etching, as compared with the machining, it is possible to suppress the occurrence of fine cracks or the like and thus to prevent a reduction in the strength of the cover glass otherwise caused by these cracks or the like.

As the above-mentioned luminous pigment (luminous material), use is generally made of, for example, a zinc sulfide-based luminous material (ZnS:Cu, green light emission). Alternatively, use can be preferably made of a luminous material obtained by using, as the mother crystal, a compound expressed by $CaAl_2O_4$, $SrAl_2O_4$, or $BaAl_2O_4$, adding thereto europium or the like as an activating agent, and further adding thereto, as a co-activating agent, at least one or more elements selected from cerium, praseodymium, neodymium, samarium, terbium, dysprosium, holmium, erbium, thulium, ytterbium, and lutetium.

A screen printing method, for example, can be used for forming the above-mentioned luminous portion. In this case, use can be made of a paint (ink) obtained by properly adding a necessary additive to a mixture of the above-mentioned luminous pigment and a clear resin component and adjusting the viscosity with a solvent. After printing the luminous portion, it is preferable to carry out heat drying under drying conditions taking into account the resin component of the paint. In order to further enhance the luminance by the luminous portion, the luminous portion may be formed, for example, after carrying out white underprinting.

In order to obtain high luminance, the coating thickness (thickness after drying) of the luminous portion is preferably 50 μm or more and, in order to further enhance the luminance and enable light emission for a longer time (e.g. 1 hour or more), it is preferably 100 μm or more.

The depth of the recess that causes the user to recognize it as the character or figure is, as described before, determined in consideration of the thickness of the cover glass excluding the depth of the recess, i.e. the remaining thickness of the cover glass, and so on. On the other hand, in the case where the above-mentioned luminous portion is formed in this recess, in terms of reducing the thickness of the cover glass, the depth of the recess may be determined also in consideration of the coating thickness of the luminous portion. This also applies to the case where the luminous portion is formed in the recess which is not particularly intended to cause the user to recognize it as the character or figure, but which, for example, is formed in the outer peripheral region of the cover glass so as to allow the user to recognize the outer periphery of the mobile device.

In the case where a plurality of recesses are formed on the cover glass, luminous portions may be formed respectively in all the recesses or in part of the recesses. Further, the luminous portion may be formed so as to cover substantially the entire surface of the recess or may be formed only at a part of a surface of the recess.

As described above, according to this embodiment, it is possible to provide a mobile device cover glass that allows a user to recognize a recess of the cover glass even in a dark environment such as outdoors at night to satisfactorily operate a mobile device. Further, since the recess corresponding to a character or a figure emits light in a dark place, it is possible to improve the aesthetic beauty.

EXAMPLES

Hereinbelow, this invention will be described in further detail with reference to specific Examples. This invention is not limited to the following Examples.

Example 1

A cover glass of this Example was manufactured through (1) Plate Glass Cutting Process, (2) Recess Forming Process, and (3) Chemical Strengthening Process, which will be described hereinbelow.

(1) Plate Glass Cutting Process

First, a plate glass with a thickness of 0.5 mm which was made of an aluminosilicate glass and manufactured by a downdraw method or a float method was cut into small pieces, thereby obtaining cover glasses each having a predetermined size (10 cm×5 cm). As the aluminosilicate glass, use was made of a glass for chemical strengthening containing 58 to 75 wt % $SiO_2$, 5 to 23 wt % $Al_2O_3$, 3 to 10 wt % $Li_2O$, and 4 to 13 wt % $Na_2O$.

This cutting of the plate glass was carried out by etching. Specifically, a resist (photosensitive organic material) was coated on both front and back main surfaces of the plate glass and then predetermined exposure and development were carried out to form resist patterns each having a cutting line pattern (i.e. no resist is present on a cutting line of each resist pattern), wherein the resist patterns were symmetrical to each other on the front and back main surfaces of the plate glass. Then, using the resist patterns as masks, wet etching was carried out by the use of an etchant (e.g. acidic solution containing hydrofluoric acid) capable of dissolving the material of the plate glass, thereby penetrating the plate glass from its front and back main surfaces on the cutting lines so that the plate glass was cut into small pieces. Then, the remaining resist patterns were stripped and then cleaning was carried out, thereby obtaining the cover glasses of the predetermined size.

(2) Recess Forming Process

Figure 8A:
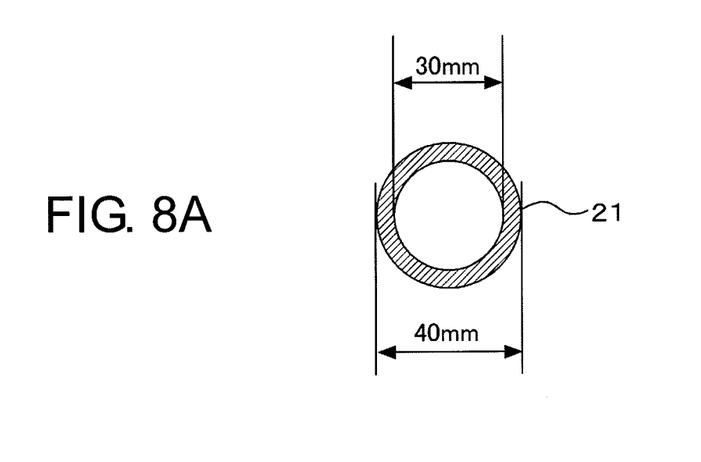
FIGS. 8A to 8C are diagrams for explaining a strength test method.
Figure 8B:
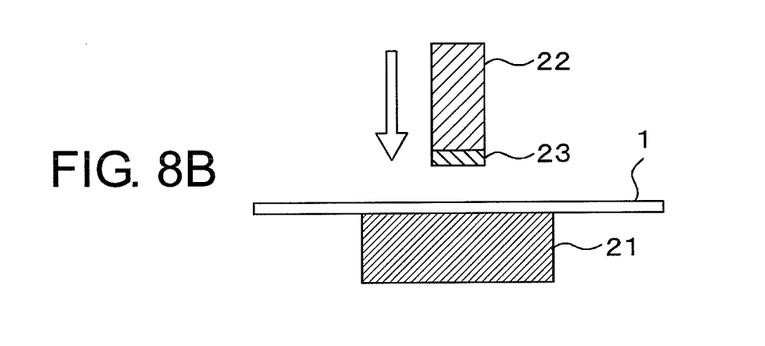
Figure 8C:
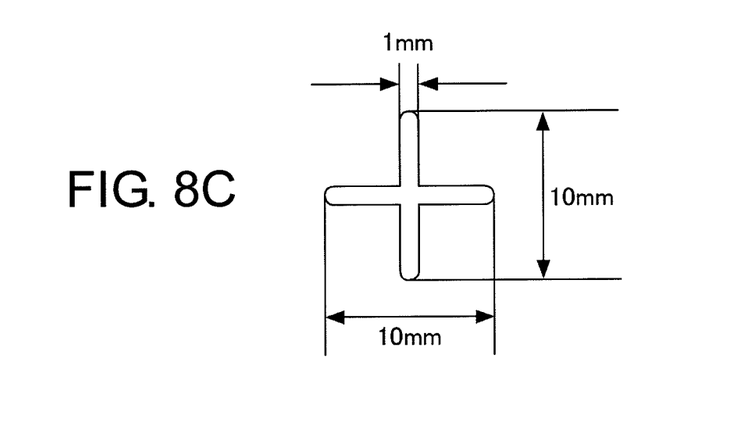

Then, the same resist as described above was coated on both front and back main surfaces of the cover glass thus obtained. Then, predetermined exposure and development were carried out to form a resist pattern having a recess pattern on each of the front and back opposite main surfaces of the cover glass. Then, using the resist patterns as masks, wet etching was carried out by the use of an etchant (e.g. acidic solution containing hydrofluoric acid) capable of dissolving the material of the cover glass, thereby forming recesses, each having a cross section shown in FIG. 5 and each capable of being recognized as a cross shown in FIG. 8C when watching from the front side (i.e. in plan view), on both front and back main surfaces of the cover glass, respectively. Then, the remaining resist patterns were stripped and then cleaning was carried out.

The etching time was adjusted so that the sum of the depths (thicknesses in depth direction) of the front and back recesses became 250 μm. Thus, the thickness of the cover glass excluding the thicknesses in the depth direction of the recesses on both front and back main surfaces was 250 μm.

(3) Chemical Strengthening Process

Then, chemical strengthening was applied to the cover glass having been subjected to the above-mentioned recess forming process. The chemical strengthening was carried out by preparing a chemical strengthening solution in the form of a mixture of potassium nitrate and sodium nitrate, heating this chemical strengthening solution to 380° C., and immersing the cover glass in the chemical strengthening solution for about 4 hours. The cover glass having been subjected to the chemical strengthening was immersed in respective cleaning baths of neutral detergent, pure water, pure water, IPA, and IPA (vapor drying) in turn so as to be ultrasonically cleaned and dried.

In this manner, the cover glass of this Example was completed.

Then, the compressive stress value, the internal tensile stress value, the Young's modulus, and the Vickers hardness of the completed cover glass were respectively measured. Measurement methods were the same as those described before. The depth of the recess was measured using the non-contact Z-axis measuring microscope "micron depth/height measuring microscope: KY-90-HL-TV" manufactured by Nisshooptical Co., Ltd. The compressive stress value and the compressive stress layer depth (thickness) at a main surface flat portion and the internal tensile stress value at a main surface flat portion were measured using the precision strain gauge "BSP-3" manufactured by Orihara Seisakusho Co., Ltd. The Young's modulus was measured using a sound velocity measuring apparatus "UVM-2" manufactured by Ultrasonic Engineering Co., Ltd. The Vickers hardness was measured using a microhardness tester "MVK-E" manufactured by Akashi Seisakusho Co., Ltd.

The static strength of the cover glass was also measured. Specifically, on a ring-shaped stainless receiving jig 21 with an outer diameter of 40 mm and an inner diameter of 30 mm shown in FIG. 8A, a cover glass 1 as a measurement object is placed so that the ring-shaped receiving jig 21 surrounds, from below, a recess-formed area of the cover glass 1 and, then, a cylindrical steel flat head 22 with a diameter of 10 mm presses, from above, a recess-formed portion of the cover glass 1 with a load of 200N for 2 seconds (see FIG. 8B). A silicon rubber 23 (rubber hardness: 50 (JIS K6253 or ISO18517)) with a thickness of 1 mm is bonded to a front end of the flat head 22.

As a result, when the number of cover glass samples that were broken was zero out of 30 cover glass samples, "⊚" was given, when the number of cover glass samples that were broken was 1 or 2 out of 30 cover glass samples, "Δ" was given, and when the number of cover glass samples that were broken was 3 or more out of 30 cover glass samples, "x" was given.

The results obtained are collectively shown in Table 1 below.

Examples 2 to 12

Cover glasses were respectively manufactured in the same manner as in Example 1 except that the thickness, the recess depth (sum), and the remaining thickness were respectively set to values shown in Table 1 below. Also with respect to the cover glasses obtained in Examples 2 to 12, the compressive stress value, the internal tensile stress value, the Young's modulus, the Vickers hardness, and the strength were respectively measured by the same methods as in Example 1 and the results obtained are collectively shown in Table 1 below.

Example 13

A cover glass was manufactured in the same manner as in Example 1 except for the resist pattern forming condition in the recess forming process.

In Example 13, on each main surface of the cover glass, there was formed a resist pattern having a polymerization degree gradient in its thickness direction so that the polymerization degree becomes minimum on the main surface side thereof, and then, using the resist patterns as masks, wet etching was carried out. As a result, as shown in FIG. 9, an edge portion of each recess was formed into a rounded shape. It is considered that the adhesion between the glass (main surface) and the resist was weakened in the formation of the resist pattern so that the edge portion was rounded. The shape of the recess was confirmed by cutting a recess-formed portion of the cover glass and observing the cross-sectional shape of the recess using a microscope.

Figures 10A, 10B:
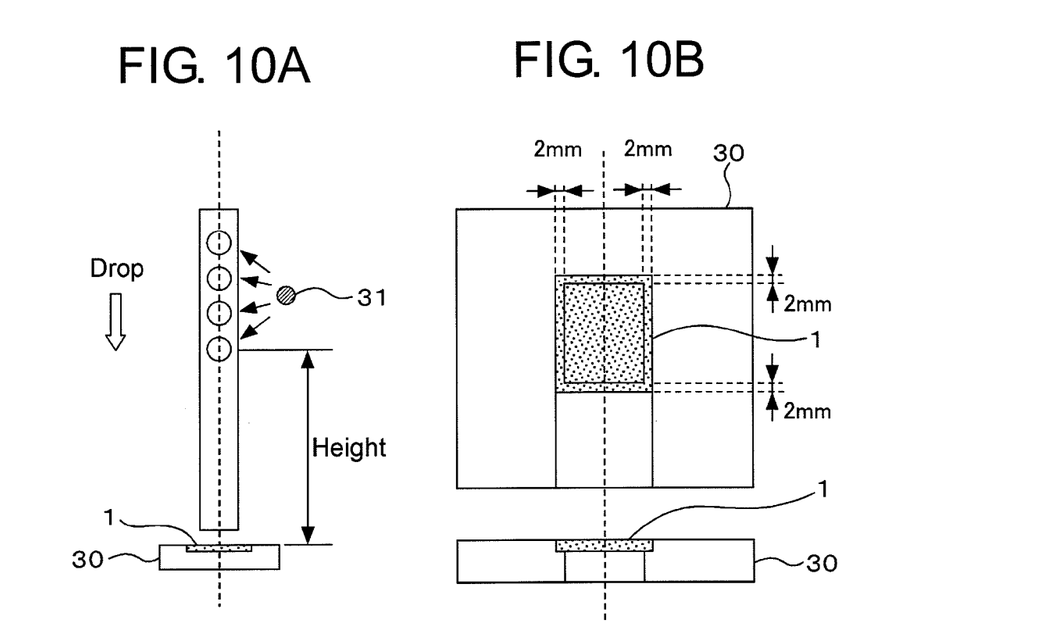
FIGS. 10A and 10B are diagrams for explaining another strength test method.

Then, with respect to the cover glasses of Example 13 and Example 1, a strength test was conducted wherein the strength was evaluated by dropping a ball. As shown in FIGS. 10A and 10B, this strength test is a dropping test that drops a ball 31 onto a sample 1 (cover glass) set on a holder 30 (see FIG. 10A). The sample 1 is placed at a through portion of the holder 30 and is held at its 2 mm-width edge portions by the holder 30 (see FIG. 10B). The ball dropping position is a recess-formed portion of the sample 1. Herein, the ball 31 has a weight of 32 g and a diameter of 20 mm and its material is SUS304. A material of the holder 30 is also SUS304.

The strength was evaluated based on the occurrence/non-occurrence of breakage by changing the distance between a ball dropping start position and the cover glass (hereinafter referred to as a "height") (see FIG. 10A). 10 cover glasses were measured at each height.

As a result of the measurement, there was no breakage of any of the cover glasses of Example 13 at a height of 800 mm, while one cover glass was broken at a height of 900 mm. On the other hand, there was no breakage of any of the cover glasses of Example 1 at a height of 700 mm, while two cover glasses were broken at a height of 800 mm. From this, it is seen that the strength of the cover glass of Example 13 is greater than that of the cover glass of Example 1. It is considered that while the edge portion of each recess on the cover glass of Example 1 is not rounded as shown in FIG. 5, the edge portion of each recess on the cover glass of Example 13 is rounded as shown in FIG. 9 and thus stress concentration that occurs upon ball dropping is relaxed, thereby achieving high strength.

Comparative Examples 1 to 3

In (2) Recess Forming Process, recesses on both front and back main surfaces of a cover glass were formed by sand blasting, i.e. by machining. The thickness of the cover glass, the recess depth (sum), and the thickness of the cover glass excluding the thicknesses in the depth direction of the recesses on both front and back main surfaces, i.e. the remaining thickness, were the same as those in Example 1.

A cover glass (Comparative Example 1) was manufactured in the same manner as in Example 1 except for this point.

Cover glasses of Comparative Examples 2 and 3 were respectively manufactured in the same manner as in Comparative Example 1 except that the thickness, the recess depth (sum), and the remaining thickness were respectively set to values shown in Table 1 below.

Also with respect to the cover glasses obtained in Comparative Examples 1 to 3, the compressive stress value, the internal tensile stress value, the Young's modulus, the Vickers hardness, and the strength were respectively measured by the same methods as in Example 1 and the results obtained are collectively shown in Table 1 below.

was assumed that the compressive stress value and the compressive stress layer depth at the recess were the same as the compressive stress value (measured value) and the compressive stress layer depth (measured value) at the main surface flat portion. The internal tensile stress at the main surface flat portion is a calculated value obtained by a formula of "compressive stress value×compressive stress layer depth/(thickness−compressive stress layer depth)". In Table 1, "recess" shows a value of "compressive stress value×compressive stress layer depth/(remaining thickness−compressive stress layer depth)". Herein, the value of "compressive stress value× compressive stress layer depth/(remaining thickness−compressive stress layer depth)" is considered to correspond to an internal tensile stress, at a portion corresponding to the recess, of the main surface of the cover glass.

From the results of Table 1, it is confirmed that the cover glass of each Example in which the recesses were formed by the etching has sufficient strength even if it is thin or lightweight or is large in area and, further, even if it is formed with the recesses that can be recognized as characters or figures, and thus is suitable as a cover glass for a touch-panel mobile device which is particularly required to be improved in strength of its display screen. From a comparison between Examples 4 and 6 and the other Examples, it is confirmed that the value of "compressive stress value×compressive stress layer depth/(remaining thickness−compressive stress layer depth)" is preferably 150 MPa or less in terms of the strength.

As described above, the strength evaluation result by the ball dropping test method was better for the cover glass of Example 13 than for the cover glass of Example 1. That is, in terms of the strength, the edge portion of the recess preferably has the rounded shape.

TABLE 1

| | recess formation | thickness [μm] | recess depth (sum) [μm] | remaining thickness (minimum portion) [μm] | main surface flat portion compressive stress layer depth [μm] | thickness ratio | compressive stress [MPa] | internal tensile stress [MPa] | recess compressive stress value × compressive stress layer depth/ (remaining thickness − compressive stress layer depth) [MPa] | properties Young's modulus [GPa] | Vickers hardness | strength |
|---|---|---|---|---|---|---|---|---|---|---|---|---|
| Example 1 | etching | 500 | 250 | 250 | 40 | 6.3 | 410 | 39 | 96 | 79 | 650 | ○ |
| Example 2 | etching | 500 | 100 | 400 | 40 | 10.0 | 620 | 59 | 78 | 72 | 730 | ○ |
| Example 3 | etching | 800 | 150 | 650 | 100 | 6.5 | 300 | 50 | 67 | 83 | 530 | ○ |
| Example 4 | etching | 500 | 100 | 400 | 110 | 3.6 | 330 | 130 | 202 | 83 | 550 | △ |
| Example 5 | etching | 600 | 200 | 400 | 45 | 8.9 | 680 | 60 | 99 | 79 | 800 | ○ |
| Example 6 | etching | 500 | 350 | 150 | 40 | 3.8 | 350 | 33 | 200 | 79 | 550 | △ |
| Example 7 | etching | 900 | 400 | 500 | 80 | 6.3 | 380 | 41 | 89 | 79 | 700 | ○ |
| Example 8 | etching | 300 | 100 | 200 | 20 | 10.0 | 580 | 45 | 73 | 72 | 750 | ○ |
| Example 9 | etching | 700 | 400 | 300 | 45 | 6.7 | 520 | 38 | 111 | 72 | 520 | △ |
| Example 10 | etching | 1000 | 200 | 800 | 20 | 40.0 | 800 | 17 | 21 | 72 | 770 | ○ |
| Example 11 | etching | 1000 | 550 | 450 | 20 | 22.5 | 800 | 17 | 39 | 72 | 780 | ○ |
| Example 12 | etching | 1500 | 750 | 750 | 25 | 30.0 | 1000 | 17 | 36 | 72 | 820 | ○ |
| Comparative Example 1 | machining | 500 | 250 | 250 | 40 | 6.3 | 410 | 39 | 96 | 79 | 650 | × |
| Comparative Example 2 | machining | 500 | 100 | 400 | 40 | 10.0 | 620 | 59 | 78 | 72 | 730 | × |
| Comparative Example 3 | machining | 800 | 150 | 650 | 100 | 6.5 | 300 | 50 | 67 | 83 | 530 | × |

In Table 1, "thickness ratio" represents a ratio of remaining thickness/compressive stress layer depth. The compressive stress value and the compressive stress layer depth at the main surface flat portion were measured by the Babinet method. It When the ratio of the remaining thickness to the overall thickness (remaining thickness/overall thickness) is set to 45% or less, the internal tensile stress at the main surface flat portion is preferably 20 MPa or less and more preferably 17

MPa or less. With this range, it is possible to further prevent breakage of the cover glass.

The internal tensile stress at the main surface flat portion is preferably 100 MPa or less, more preferably 70 MPa or less, and further preferably 60 MPa or less. The compressive stress value is particularly preferably 550 MPa or more or 600 MPa or more. With these ranges, it is possible to further prevent breakage of the cover glass.

By setting the compressive stress value to 550 MPa or more and the internal tensile stress at the main surface flat portion to 100 MPa or less, it is possible to particularly prevent breakage of the cover glass. This is particularly effective in any of (A) the case of the cover glass having a thickness of 1500 μm or less, (B) the case where the ratio of the remaining thickness to the overall thickness (remaining thickness/overall thickness) is set to 80% or less, and (C) the case where the area of the main surface of the cover glass is set to 30 cm$^2$ or more, more preferably 50 cm$^2$ or more, and particularly preferably 70 cm$^2$.

On the other hand, in the case of the cover glass of each Comparative Example which is thin or lightweight or is large in area and, further, which is formed with the recesses that can be recognized as characters or figures by the machining, the strength thereof is insufficient even if it is chemically strengthened, and thus it is difficult to use such a cover glass as a cover glass for a touch-panel mobile device which is particularly required to be improved in strength of its display screen.

Example 14

A luminous portion was formed in the recess of the cover glass manufactured in Example 1. The formation of this luminous portion was carried out by a screen printing method. Specifically, use was made of a paint obtained by mixing phosphorescent zinc sulfide (ZnS:Cu) as a luminous pigment and a polyurethane-based or acrylic-based clear resin in the weight ratio of 1:1 and properly adjusting the viscosity with a solvent, and use was made of a screen with a mesh of #150. After printing, heat drying was carried out at 100° C. The thickness of the luminous portion after the drying was 100 μm.

A mobile telephone incorporated with a mobile device cover glass of this Example in which the luminous portion was thus formed was used outdoors at night. As a result, it was possible to obtain high luminance that sufficiently enabled visual recognition of the recess formed on the cover glass and, further, it was confirmed that light emission continued for 1 hour or more.

While this invention has been described with reference to the embodiments, the technical scope of the invention is not limited to the scope of the description of the above-mentioned embodiments. It is obvious to those skilled in the art that various changes or improvements can be added to the above-mentioned embodiments. It is clear from the description of claims that the modes added with such changes or improvements can also be included in the technical scope of this invention.

What is claimed is:

1. A cover glass for use in a mobile device,
   wherein a recess that is recognized as a character or a figure when watching from a front side of the mobile device or a recess that is recognized when touching from the front side of the mobile device is formed on at least one of opposite main surfaces of the cover glass, and
   wherein a surface of the recess is an etched surface treated by etching,
   wherein a value of compressive stress value×compressive stress layer depth/(remaining thickness−compressive stress layer depth) is 150 MPa or less where the remaining thickness represents a thickness of the cover glass excluding a depth of the recess and where the compressive stress value and the compressive stress layer depth respectively represent a compressive stress value and a depth of a compressive stress layer at a flat portion of the main surface of the cover glass.

2. The cover glass according to claim 1, wherein the cover glass is made of a chemically strengthened aluminosilicate glass.

3. The cover glass according to claim 1, wherein the recess that is recognized as the character or the figure when watching from the front side of the mobile device is formed on each of the opposite main surfaces of the cover glass.

4. The cover glass according to claim 1, wherein an edge portion at a boundary between a flat portion of the main surface of the cover glass and an inner surface of the recess has a rounded shape.

5. The cover glass according to claim 1, wherein an end face of the cover glass is an etched surface treated by etching.

6. The cover glass according to claim 1, wherein at least a part of the recess comprises a luminous portion containing a luminous material that is recognized by a user even in an environment where a quantity of light irradiated on the cover glass is small.

7. A cover glass for use in a mobile device,
   wherein opposite main surfaces of the cover glass comprises an area corresponding to a touch panel which enables the mobile device to be operated by pressing a predetermined portion,
   wherein a recess that is recognized as a character or a figure when watching from a front side of the mobile device or a recess that is recognized when touching from the front side of the mobile device is formed on at least one of the main surfaces of the cover glass, and
   wherein a surface of the recess is an etched surface treated by etching,
   wherein a value of compressive stress value×compressive stress layer depth/(remaining thickness−compressive stress layer depth) is 150 MPa or less where the remaining thickness represents a thickness of the cover glass excluding a depth of the recess and where the compressive stress value and the compressive stress layer depth respectively represent a compressive stress value and a depth of a compressive stress layer at a flat portion of the main surface of the cover glass.

8. The cover glass according to claim 7, wherein the cover glass is made of a chemically strengthened aluminosilicate glass.

9. The cover glass according to claim 7, wherein the recess is present in the area corresponding to the touch panel.

10. The cover glass according to claim 7, wherein the recess that is recognized as the character or the figure when watching from the front side of the mobile device is formed on each of the opposite main surfaces of the cover glass.

11. The cover glass according to claim 7, wherein an edge portion at a boundary between a flat portion of the main surface of the cover glass and an inner surface of the recess has a rounded shape.

12. The cover glass according to claim 7, wherein an end face of the cover glass is an etched surface treated by etching.

13. The cover glass according to claim 7, wherein at least a part of the recess comprises a luminous portion containing a luminous material that is recognized by a user even in an environment where a quantity of light irradiated on the cover glass is small.

14. A cover glass for use in a mobile device,
wherein a recess that is recognized as a character or a figure when watching from a front side of the mobile device or a recess that is recognized when touching from the front side of the mobile device is formed on at least one of opposite main surfaces of the cover glass, and
wherein a surface of the recess is an etched surface treated by etching,
wherein the cover glass is chemically strengthened in order to prevent breakage of the cover glass when the cover glass is placed on a ring-shaped stainless receiving jig with an outer diameter of 40 mm and an inner diameter of 30 mm which is disposed so as to surround an area, where the recess is formed, of the cover glass and then a cylindrical steel flat head with a diameter of 10 mm presses, from above, a recess-formed portion of the cover glass with a load of 200N for 2 seconds, the cylindrical steel flat head having a front end to which an elastic material with a thickness of 1 mm and with a rubber hardness of 50 (JIS K6253 or ISO18517) is bonded.

15. A cover glass for use in a mobile device,
wherein opposite main surfaces of the cover glass comprises an area corresponding to a touch panel which enables the mobile device to be operated by pressing a predetermined portion,
wherein a recess that is recognized as a character or a figure when watching from a front side of the mobile device or a recess that is recognized when touching from the front side of the mobile device is formed on at least one of the main surfaces of the cover glass, and
wherein a surface of the recess is an etched surface treated by etching,
wherein the cover glass is chemically strengthened in order to prevent breakage of the cover glass when the cover glass is placed on a ring-shaped stainless receiving jig with an outer diameter of 40 mm and an inner diameter of 30 mm which is disposed so as to surround an area, where the recess is formed, of the cover glass and then a cylindrical steel flat head with a diameter of 10 mm presses, from above, a recess-formed portion of the cover glass with a load of 200N for 2 seconds, the cylindrical steel flat head having a front end to which an elastic material with a thickness of 1 mm and with a rubber hardness of 50 (JIS K6253 or ISO18517) is bonded.

* * * * *